US 8,762,138 B2

(12) United States Patent
Holtel et al.

(10) Patent No.: US 8,762,138 B2
(45) Date of Patent: Jun. 24, 2014

(54) METHOD OF EDITING A NOISE-DATABASE AND COMPUTER DEVICE

(75) Inventors: Stefan Holtel, Aying (DE); Jad Noueihed, Beirut (LB)

(73) Assignee: Vodafone Holding GmbH, Duesseldorf (DE)

( * ) Notice: Subject to any disclaimer, the term of this patent is extended or adjusted under 35 U.S.C. 154(b) by 310 days.

(21) Appl. No.: 12/807,190

(22) Filed: Aug. 30, 2010

(65) Prior Publication Data

US 2011/0208518 A1   Aug. 25, 2011

(30) Foreign Application Priority Data

Feb. 23, 2010  (EP) .................................. 101 54 418

(51) Int. Cl.
*G10L 21/00*  (2013.01)
(52) U.S. Cl.
USPC ... 704/226; 379/391; 379/392.01; 379/88.03; 455/456.2; 455/457; 455/570; 455/69; 704/233; 704/246; 704/270.1
(58) Field of Classification Search
USPC ............ 704/233, 246, 270.1; 455/570, 456.2, 455/457, 69; 379/391, 392.01, 88.03
See application file for complete search history.

(56) References Cited

U.S. PATENT DOCUMENTS

| 5,524,148 | A | * | 6/1996 | Allen et al. .................... 379/391 |
| 5,890,068 | A | * | 3/1999 | Fattouche et al. .......... 455/456.2 |
| 5,953,700 | A | * | 9/1999 | Kanevsky et al. ......... 704/270.1 |
| 5,970,446 | A | * | 10/1999 | Goldberg et al. ............. 704/233 |
| 6,049,700 | A | * | 4/2000 | Hardouin ........................ 455/69 |
| 6,377,680 | B1 | * | 4/2002 | Foladare et al. ......... 379/392.01 |
| 6,615,171 | B1 | * | 9/2003 | Kanevsky et al. ............. 704/246 |
| 7,738,635 | B2 | * | 6/2010 | Groves et al. ............. 379/88.03 |
| 7,742,790 | B2 | * | 6/2010 | Konchitsky et al. .......... 455/570 |
| 8,077,836 | B2 | * | 12/2011 | Gilbert ....................... 379/88.03 |
| 8,081,992 | B2 | * | 12/2011 | Book ........................... 455/457 |
| 2002/0006207 | A1 | | 1/2002 | Matero et al. |
| 2008/0021706 | A1 | * | 1/2008 | Bruwer ......................... 704/233 |
| 2009/0168984 | A1 | | 7/2009 | Kreiner et al. |

FOREIGN PATENT DOCUMENTS

DE  100 49 738 A1  6/2002

\* cited by examiner

*Primary Examiner* — Michael Colucci
(74) *Attorney, Agent, or Firm* — Kriegsman & Kriegsman

(57) ABSTRACT

The present invention relates to a method as well as to a computing device (20) for editing a noise-database (13) containing noise information, said noise information being derived from noise signals within an audio stream (19). In order to enhance possibilities to create and utilize context information which emerge from tracking noise signals from an audio stream, for example a telephone call, the above method is characterized by the following steps: A) in a localizing step (14), determining geographical data of the location the noise signals origin from; B) in an analyzing step (15), analyzing the noise signals with reference to the noise content; C) in a linking step, linking the analyzed noise signals to said geographical data to create noise information; D) in a storing step, storing said noise information within said noise-database (13). The present invention further relates to a method of treating noise signals within an audio stream (18), said audio stream comprising noise signals and additional audio signals, preferably voice signals.

11 Claims, 2 Drawing Sheets

METHOD OF EDITING A NOISE-DATABASE AND COMPUTER DEVICE

Figure 1:
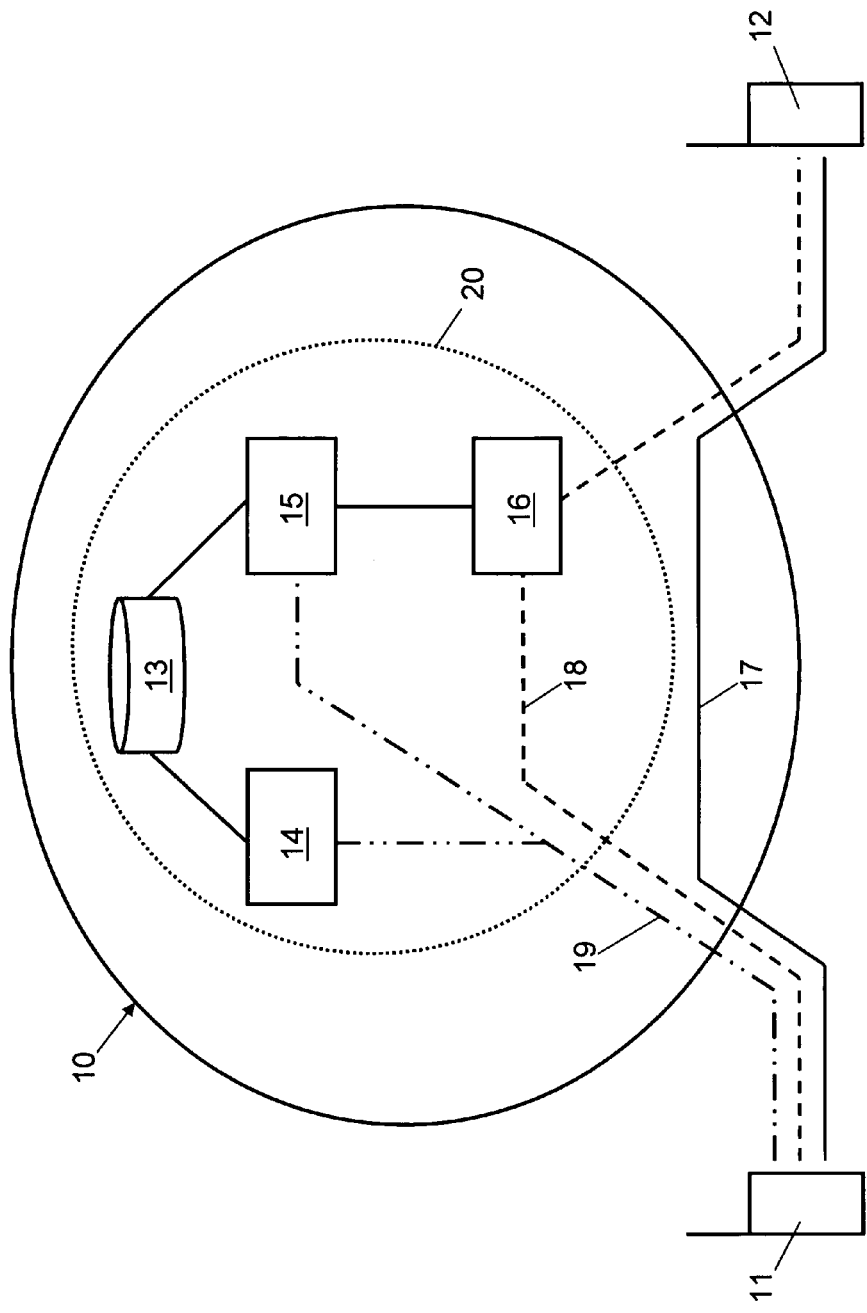

The present invention relates to noise based information extraction, and more particularly to a method of editing a noise-database containing noise information according to the preamble of claim 1, a computing device for editing a noise-database containing noise information according to the preamble of claim 7 and to a method of treating noise signals within an audio stream according to the preamble of claim 9.

For example, such an audio stream can contain noise signals as well as additional audio signals, voice signals for example. In the latter case, the audio stream can be formed as a telephone call for example. Telephone calls can be performed between mobile phones for example. In the following, preferred embodiments of the present invention are described by making use of audio streams in the form of telephone calls between telecommunication devices, particularly between at least one mobile phone and a further telecommunication device. However, the present invention is not limited to specific types of audio streams.

In a typical usage environment of a mobile phone it is not unusual that background noises do exist which badly influence the quality of audio signal transmission. For example, if the user of a mobile phone is located at a place with much background noise and if the user wants to make a phone call to another person, it is often difficult for the callee to understand the caller due to the existing background noise. It is therefore a need to provide solutions that allow treating and eliminating such background noise.

According to a solution existing in general prior art a mobile electronic device, for example a mobile phone, comprises a microphone that detects audio signals such as voice data from the caller as well as background noises. A processing unit within said electronic device processes those incoming audio signals from said microphone and filters out background noises. The remaining audio signals, the voice signals for example, are transmitted to a communication processing unit within said electronic device. From there the remaining audio signals are transmitted to an electronic receiver device, another mobile phone for example.

Therefore, it is known from the general prior art to filter out background noise from voice signals such that only "pure" voice signals are transmitted. Usually the filtered out background noise signals are eliminated and deleted. This is a drawback since such noise signals could serve as a basis for various services.

With regard to the treatment of background noise various suggestions haven been made in the prior art. For example DE 100 49 738 A1 discloses an automatic mute switching system, said system using a microphone incorporated in the housing of a mobile audio device or mobile phone, for detection of background noise. The switching system is coupled to an electronic noise analysis device, comparing the detected noise with stored sound characteristics. Based on the comparison results a switch can be operated for activating or de-activating the mute control for the loudspeakers in the headset of said mobile device.

US 2002/0006207 A1 relates to a method of providing a user with information on the operation of a portable device and to a portable device. In the device, such a tone is produced that, due to a tone feature, can be distinguished from background noise. This feature can be tone frequency, duration, volume or moment of time. The device can analyse background noise automatically, and based on this, it adjusts at least one feature of the tone automatically such that the tone can be distinguished from background noise, and the background noise does not mask out the tone.

It is the object of the present invention to provide a method and computer device for editing a noise-database containing noise information as well as a method of treating noise signals within an audio stream which allow overcoming those drawbacks as mentioned before. More particularly, it is the object of the present invention to provide solutions which enhance possibilities to create and utilize context information which emerge from tracking noise signals from an audio stream, for example a telephone call.

The object is solved by the method comprising those features according to independent claim 1, the computing device comprising those features according to independent claim 7 and by the method comprising those features according to independent claim 9. Additional features and details of the invention are evident from the dependent claims, from the description and from the drawings. Features and details, which are described with regard to the method according to the first aspect of the present invention, are effective with regard to the computing device according to the second aspect of the present invention and to the method according to the third aspect of the present invention as well. Features and details, which are described with regard to the computing device according to the second aspect of the present invention, are effective with regard to the method according to the first aspect of the present invention and to the method according to the third aspect of the present invention as well. Features and details, which are described with regard to the method according to the third aspect of the present invention, are effective with regard to the computing device according to the second aspect of the present invention and to the method according to the first aspect of the present invention as well.

The present invention is based on the general finding that noise based information can be extracted from an audio stream and that those noise based information can be used as context information for various applications.

According to a first aspect of the present invention, the object is solved by a method of editing a noise-database containing noise information, said noise information being derived from noise signals within an audio stream. This method is characterized by the following steps:
A) in a localizing step, determining geographical data of the location the noise signals origin from;
B) in an analyzing step, analyzing the noise signals with reference to the noise content;
C) in a linking step, linking the analyzed noise signals to said geographical data to create noise information;
D) in a storing step, storing said noise information within said noise-database.

In particular, this method comprises three functional blocks, namely a location detection block, a noise analysis block and a storage block.

The invention according to this first aspect is directed to a method of editing a noise-database containing noise information. The step of editing a database according to the present invention preferably comprises the generation and/or maintenance of such a database. A noise according to the present invention is not limited to specific types of noise. The method according to the present invention can be performed on the basis of any kind of noise or sound. In particular the method according to the present invention is directed to editing a noise-database containing background noise information. In particular, a background noise is any sound other than the sound being typical in the field of application of the electronic device. Background noise can be a form of noise pollution or interference. Examples of background noises are environmental noises such as traffic noise, alarms, people talking, noise from animals, mechanical noise from machines, and the like.

Such noise information which is stored within said noise-database is derived from noise signals within an audio stream. An audio stream is preferably defined as a stream of audio signals. The audio stream particularly comprises noise signals as well as additional audio signals which are typical in the field of application of the audio stream. In case that the audio stream is formed as a telephone call, said audio stream can comprise audio signals in the form of voice signals as well as noise signals, preferably in the form of background noise.

In a first step, a localizing step, geographical data of the location the noise signals origin from are determined. For example, if the audio stream is performed between two telecommunication devices, mobile phones for example, the location the noise signals origin from generally is the location of a telecommunication device, a mobile phone for example. In such a case it is suitable to determine the location of the telecommunication device, which per se is well known in the prior art. Those geographical data of said telecommunication device are preferably linked to the noise signals which are detected and/or generated by said telecommunication device.

During an analyzing step, the noise signals are analyzed with reference to the noise content. According to the present invention, those noise signals are not filtered out and eliminated. Instead of his, the noise signals are further processed by analyzing same, which is preferably performed in a context related manner. Preferred embodiments hereto are described in greater detail further below.

During a linking step, the analyzed noise signals are linked to those geographical data in order to create noise information. According to the present invention geographical data, which represent the location a noise signal origins from, are linked to noise signals which allow an indication what is happening at this specific location. This goal is achieved by analyzing the content of those noise signals. Thus, a context related noise information is generated for a specific location. This information can be used for various applications.

Finally, during a storing step, said noise information is stored within said noise-database.

The present invention generally relates to a solution for analyzing noise in order to estimate the noise meaning and in order to create a noise meaning database.

According to the present invention, filtered out background noise from an audio stream can be further processed. It is analysed and used to create a noise meaning database. The information stored in such a database can be used in connection with various services, such as location based advertisement or the like.

The recognized and preferably filtered out background noise is analysed and processed in a context related manner. The analysed noise is linked to geographical data of the location said noise origins from.

Within the noise-database the information relating to different noises is linked to geographical data. Thus, the noise-database comprises information what kind of noise exists at a specific locations. Therefore it is possible to provide information "what generally happens at a specific location".

According to the present invention it is possible to create a specific noise context for a specific location, said context being useful for various services.

Preferably said database is self-learning. Over the time the database contains more and more details and becomes more and more precise.

Advantageously, the method according to the present invention is performed within a computing device. In such a case the method is characterized by the following steps that are performed within said computing device:
A) in a receiving step, receiving noise signals;
B) in a localizing step, detecting or receiving geographical data of the location the noise signals origin from;
C) in an analysing step, analyzing the noise signals or receiving analyzed information of said noise signals;
D) in a linking step, linking the analyzed noise signals to said geographical data to create noise information;
E) in a storing step, storing said noise information within said noise-database.

The computing device is preferably arranged as a central computing device, a central server device for example. According to a preferred embodiment of the present invention the computing device is part of a communication network, a network related central computing device for example. According to a different embodiment the computing device could be arranged within a mobile electronic device, a mobile phone for example, as well.

The noise-database containing such noise information is preferably stored within a storage unit. According to a preferred embodiment of the present invention such a storage unit can be provided as a component of said computing device. According to a different embodiment of the present invention the computing device comprises an interface to an external storage unit.

Preferably, the method according to the present invention is performed within a communication network, a mobile communication network for example.

According to a preferred embodiment of the present invention the noise information is linked to a digital map for creating a digital noise map. According to this feature the noise information that is the noise-location-information is combined with a digital map. Thus, it becomes possible to create some kind of a noise map, said map giving information about noises and their locations.

Preferably, the method is adapted for editing a noise-database containing noise information, said noise information being derived from background noise signals within an audio stream. According to another preferred embodiment of the present invention, the method is adapted for editing a noise-database containing noise information, said noise information being derived from noise signals within an audio stream in form of a telephone call.

Advantageously, during the analyzing step, the noise is analyzed with regard to the noise meaning and/or the noise relation. Noise meaning preferably indicates the specific meaning of a specific noise. Noise relation preferably indicates that a specific noise is related to a specific situation, device, person or the like.

According to a second aspect of the present invention, there is provided a computing device for editing a noise-database containing noise information, said noise information being derived from noise signals within an audio stream, characterized in that the computing device comprises a receiving interface for receiving noise signals; a device for detecting geographical data of the location the noise origins from or a receiving interface for receiving geographical data of the location the noise origins from; a device for analyzing the noise signals or a receiving interface for receiving analyzed information of said noise signals; a device for linking the analyzed noise signals to said geographical data to create noise information; and a storing device storing said noise information within said noise-database or an interface to a storing device for storing said noise information within said noise-database.

Advantageously the computing device is characterized by means for performing the above described method according to the first aspect of the present invention.

According to a third aspect of the present invention there is provided a method of treating noise signals within an audio stream, said audio stream comprising noise signals and additional audio signals, preferably voice signals, said method being characterized by the following steps:

A) in a localizing step, determining geographical data of the location the audio stream origins from;
B) in a retrieving step, retrieving noise information linked to said geographical data from a noise-database which has been edited by a method according to the above described method according to the first aspect of the present invention;
C) in a comparison step, comparing the noise information retrieved from said noise-database with said audio stream;
D) in a treating step, treating the noise signals within said audio stream based on the comparison results.

According to a preferred embodiment it is suggested that during comparison step C) a noise snippet is extracted from the audio stream and that the noise snippet is compared with the noise information retrieved from said noise-database.

If the audio stream arises during a telephone call between a caller and a callee, the aforementioned method starts when the caller starts his call. In a first step the location of the caller, in particular the location of his communication device, a mobile phone for example, is detected. Furthermore, specific noise-information which are linked to the detected location, are retrieved from the noise-database. All those information are preferably forwarded to a processing unit. Such a processing unit can be a computing device or part of a computing device as described with respect to the second aspect of the present invention above. Therefore, full reference is made to the description of said second aspect of the present invention. Advantageously, only a noise snippet is grasped from the audio stream that is from the telephone call. This noise snippet is analysed to determine a noise meaning.

If the noise signals do not match with the contents of said noise database, the noise content of said noise signals is preferably analyzed and stored within said noise-database by making use of a method according to the above described method according to the first aspect of the present invention. That means, if a noise meaning is unknown, the noise meaning is preferably detected and than stored within said noise-database.

If the noise signals match with the contents of said noise database, the noise signals within said audio stream are preferably filtered out by use of the database contents, preferably by use of a noise suppression procedure. In such a case, the method comprises four functional blocks, namely a location detection block, a noise analysis block, a storage block and a noise suppression block. If the noise signal, a noise snippet for example, matches a noise meaning being stored within said noise-database, a noise suppression algorithm can be configured accordingly. The audio stream, a call for example, is preferably routed through the processing unit, where the algorithm is performed in such a manner that a noise suppression procedure can be performed on said audio stream.

The present invention generally relates to a method as well as to a computing device for editing a noise-database containing noise information, said noise information being derived from noise signals within an audio stream. In order to enhance possibilities to create and utilize context information which emerge from tracking noise signals from an audio stream, for example a telephone call, the above method is characterized by the following steps: in a localizing step, determining geographical data of the location the noise signals origin from; in an analyzing step, analyzing the noise signals with reference to the noise content; in a linking step, linking the analyzed noise signals to said geographical data to create noise information; in a storing step, storing said noise information within said noise-database. The present invention further relates to a method of treating noise signals within an audio stream, said audio stream comprising noise signals and additional audio signals, preferably voice signals.

Figure 2:
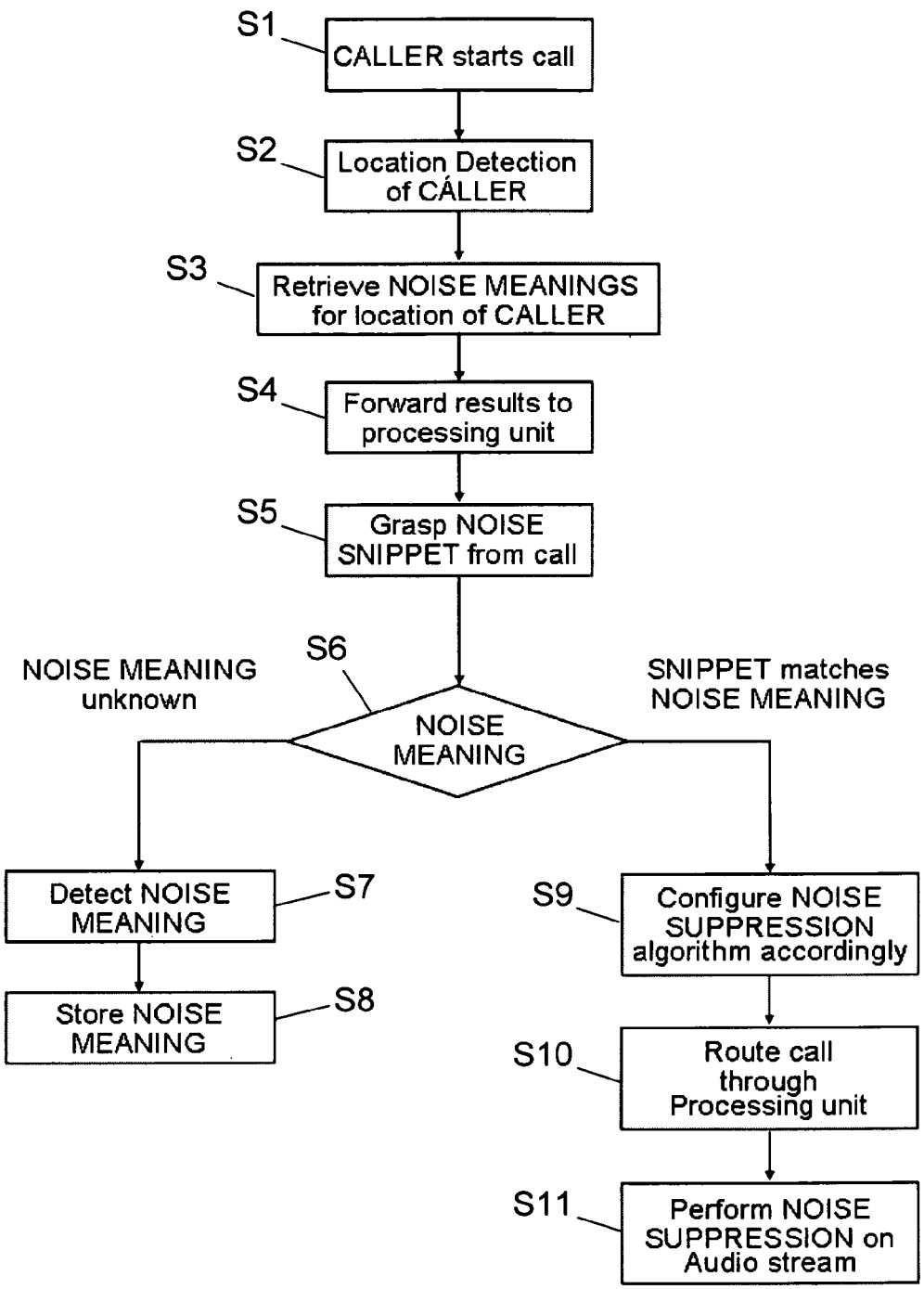

For a better understanding of the present invention a method and a computing device for editing a noise-database containing noise information, as well as a method for treating noise signals within an audio stream, embodying the present invention, will now be described by way of example with reference to the accompanying drawings, in which FIG. 1 is a schematic view of a telecommunications network incorporating a computing device according to the present invention and being adapted for performing a method for editing a noise-database containing noise information; and FIG. 2 is a representation of the process flow of a method for treating noise signals within an audio stream according to the present invention.

FIG. 1 depicts a telecommunication network 10 which is arranged as a mobile telecommunication network. Two participants want to make a telephone call through said telecommunication network 10. A first participant, the caller, is equipped with a mobile electronic device 11, a mobile phone in the present example. Likewise, a second participant, the callee, is equipped with a mobile electronic device 12, a mobile phone in the present example.

When the caller starts a call by use of his mobile electronic device 11, an audio stream 17 is transferred from mobile electronic device 11 to mobile electronic device 12. Usually, such an audio stream contains voice signals as well as background noise signals. In a typical usage environment of a mobile phone it is not unusual that background noises do exist which badly influence the quality of the audio stream 17 transmission. For example, if the user of mobile electronic device 11 is located at a place with much background noise and if the user wants to make a phone call to the callee, it is often difficult for the callee to understand the caller due to the existing background noise.

It is therefore a need to provide solutions that allow treating and eliminating such background noise. This goal can be achieved by use of a specific computing device 20 for editing a noise-database 13 containing noise information, said noise information being derived from noise signals within an audio stream. In the embodiment according to FIG. 1, noise-database 13 is part of said computing device 20. However, noise-database 13 could be arranged as a separate database as well. In such a case, computing device 20 comprises an interface to the external noise-database 13. Computing device 20 is arranged as a central computing device, a central server for example, within network 10.

The computing device 20 comprises a receiving interface for receiving noise signals, which are contained within an audio stream 19. Furthermore, computing device 20 comprises a location determination device 14 for detecting geographical data of the location the noise origins from. Furthermore, computing device 20 comprises a device 15 for analyzing the noise signals. Advantageously, the noise is analyzed with regard to the noise meaning and/or the noise relation. Additionally, computing device 20 comprises a device for linking the analyzed noise signals to said geographical data to create noise information (not shown in FIG. 1) as well as storing device (not shown in FIG. 1) for storing said noise information within said noise-database 13.

In the following, a method of editing a noise-database 13 containing noise information, said noise information being derived from noise signals within an audio stream 19, is described, said method making use of an aforementioned computing device 20.

In a first step, a localizing step, geographical data of the location the noise signals origin from are determined. For example, since the audio stream is performed between two mobile electronic devices 11, 12 devices—mobile phones for example—the location the noise signals origin from generally is the location of mobile electronic device 11. In such a case it is suitable to determine the location of the mobile electronic device 11. Those geographical data of mobile electronic device 11 are linked to the noise signals which are detected and/or generated by said mobile electronic device 11. During an analyzing step, the noise signals are analyzed with reference to the noise content. According to the present invention, those noise signals are not filtered out and eliminated. Instead of his, the noise signals are further processed by analyzing same, which is preferably performed in a context related manner. During a linking step, the analyzed noise signals are linked to those geographical data in order to create noise information. Finally, during a storing step, said noise information is stored within said noise-database.

Such a noise-database 13 can be used for treating noise signals within an audio stream. If an audio stream 18 arises during a telephone call between a caller's mobile electronic device 11 and a callee's mobile electronic device 12, the method starts when the caller starts his call. In a first step the location of the caller, in particular the location of his mobile electronic device 11 is detected. Furthermore, specific noise-information which are linked to the detected location, are retrieved from the noise-database 13. All those information are preferably forwarded to computing device 20. If the noise signals within audio stream 18 match with the contents of said noise database 13, the noise signals within audio stream 18 are preferably filtered out by use of the database contents, preferably by use of a noise suppression procedure. If the noise signals within audio stream 18 match with a noise meaning being stored within said noise-database 13, a noise suppression algorithm can be configured accordingly. The audio stream 13, a call in the present example, is preferably routed through the computing device 20, where the algorithm is performed in such a manner that a noise suppression procedure 16 can be performed on said audio stream 18. Therefore, background noises are filtered out from audio stream 18 and the remaining voice signals are transferred to callee's mobile electronic device 12.

FIG. 2 depicts the process flow of a method for treating noise signals within an audio stream according to the present invention. The audio stream shall arise during a telephone call between two participants. Each participant is equipped with a telecommunication device, a mobile phone for example. In a first Step S1, the first participant, the caller starts the call with the second participant, the callee. When starting the call, an audio stream is generated and directed from the caller's mobile phone to the callee's mobile phone, said audio stream comprising voice signals as well as background noise signals.

In a second step S2, the location of the caller, in particular the location of his mobile phone is detected. Furthermore, according to step S3, specific noise-information, so called noise meanings, which is linked to the detected location, is retrieved from the noise-database. During step S4, all those information are forwarded to a processing unit. Such a processing unit can be a computing device, as depicted in FIG. 1 for example. According to the method as shown in FIG. 2, during step S5 only a noise snippet is grasped from the audio stream that is from the telephone call. This noise snippet is analysed in step S6 to determine a noise information, a so called noise meaning.

If the noise signals do not match with the contents of said noise database, that is if the noise meaning is unknown, the noise content of said noise signals is analyzed in step S7. This means a noise meaning for said noise signals is detected. Finally, during step S8, the analyzed noise signals that is the detected noise meaning is stored within said noise-database.

If the noise signals match with the contents of said noise database that is if the noise snippet matches a noise meaning the noise signals within said audio stream are preferably filtered out by use of the database contents, preferably by use of a noise suppression procedure. In such a case, a noise suppression algorithm can be configured accordingly during step S9. During step S10, the audio stream is preferably routed through the processing unit, where, during step S11, the algorithm is performed in such a manner that a noise suppression procedure can be performed on said audio stream. Background noise can be filtered out and only the remaining "pure" voice signals are transmitted to the callee's mobile phone.

LIST OF REFERENCE NUMERALS

10 Telecommunication network
11 Mobile electronic device
12 Mobile electronic device
13 Noise-database
14 Location determination
15 Noise analysis
16 Noise suppression
17 Audio stream (untreated call)
18 Audio stream (treated call)
19 Audio stream (for editing noise-database)
20 Computing device

The invention claimed is:

1. A method of editing a noise-database containing background noise information, said background noise information being derived from noise signals within an audio stream, said audio stream being formed as a telephone call comprising audio signals in the form of voice signals as well as signals in the form of background noise, said audio stream being performed between two telecommunication devices, said method being characterized by the following steps:
A) in a localizing step, determining geographical data of the location the noise signals origin from by determining the geographical data of said telecommunication device which detects and/or generates said noise signals and by linking said geographical data of said telecommunication device to said noise signals;
B) in an analyzing step, analyzing the noise signals with reference to the noise content in a context related manner;
C) in a linking step, linking the analyzed noise signals to said geographical data which represent the location the noise signals origin from to create noise information for a specific location;
D) in a storing step, storing said noise information within said noise-database;
E) in a digital noise map creating step, linking the noise information to a digital map for creating a digital noise map, said map giving information about noises and their locations.

2. The method according to claim 1, characterized by the following steps that are performed within a computing device:

A) in a receiving step, receiving noise signals;
B) in a localizing step, detecting or receiving geographical data of the location the noise signals origin from;
C) in an analysing step, analyzing the noise signals or receiving analyzed information of said noise signals;
D) in a linking step, linking the analyzed noise signals to said geographical data to create noise information;
E) in a storing step, storing said noise information within said noise-database.

3. The method according to claim 1, characterized in that the method is adapted for editing a noise-database containing noise information, said noise information being derived from background noise signals within an audio stream.

4. The method according to claim 1, characterized in that the method is adapted for editing a noise-database containing noise information, said noise information being derived from noise signals within an audio stream in form of a telephone call.

5. The method according to claim 1, characterized in that during the analyzing step, the noise is analyzed with regard to the noise meaning and/or the noise relation.

6. A method of treating noise signals within an audio stream, said audio stream comprising noise signals and additional audio signals, preferably voice signals, said method being characterized by the following steps:
A) in a localizing step, determining geographical data of the location the audio stream origins from;
B) in a retrieving step, retrieving noise information linked to said geographical data from a noise-database which has been edited by a method according to anyone of claims 1 to 2 or 3 to 5;
C) in a comparison step, comparing the noise information retrieved from said noise-database with said audio stream;
D) in a treating step, treating the noise signals within said audio stream based on the comparison results.

7. The method according to claim 6, characterized in that during comparison step C) a noise snippet is extracted from the audio stream and that the noise snippet is compared with the noise information retrieved from said noise-database.

8. The method according to claim 6, characterized in that if the noise signals do not match with the contents of said noise database, the noise content of said noise signals is analyzed and stored within said noise-database by use of a method of editing a noise-database containing noise information, said noise information being derived from noise signals within an audio stream, said method being characterized by the following steps: A) in a localizing step, determining geographical data of the location the noise signals origin from; B) in an analyzing step, analyzing the noise signals with reference to the noise content; C) in a linking step, linking the analyzed noise signals to said geographical data to create noise information; D) in a storing step, storing said noise information within said noise-database.

9. The method according to claim 6, characterized in that if the noise signals match with the contents of said noise database, the noise signals within said audio stream are filtered out by use of the database contents, preferably by use of a noise suppression procedure.

10. A device for editing a noise-database containing background noise information, said background noise information being derived from noise signals within an audio stream, said audio stream being formed as a telephone call comprising audio signals in the form of voice signals as well as signals in the form of background noise, said audio stream being performed between two telecommunication devices, said device being characterized in that the device comprises a microphone for detecting audio signals and background noise; a device for detecting geographical data of the location the noise origins from by determining the geographical data of said telecommunication device which detects and/or generates said noise signals and by linking said geographical data of said telecommunication device to said noise signals or a receiving interface for receiving geographical data of the location the noise origins from; a device for analyzing the noise signals with reference to the noise content in a context related manner or a receiving interface for receiving analyzed information of said noise signals; a device for linking the analyzed noise signals to said geographical data which represent the location the noise signals origin from to create noise information for a specific location; a storing device storing said noise information within said noise-database or an interface to a storing device for storing said noise information within said noise-database; and a device for linking the noise information to a digital map for creating a digital noise map, said map giving information about noises and their locations.

11. The device according to claim 10, characterized in that it comprises means for performing the method according to claim 1.

* * * * *